US006532477B1

(12) United States Patent
Tang et al.

(10) Patent No.: US 6,532,477 B1
(45) Date of Patent: Mar. 11, 2003

(54) METHOD AND APPARATUS FOR GENERATING AN AUDIO SIGNATURE FOR A DATA ITEM

(75) Inventors: John C. Tang, Palo Alto, CA (US); Randall B. Smith, Palo Alto, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/511,539

(22) Filed: Feb. 23, 2000

(51) Int. Cl.[7] .............................. G06F 7/00; G06F 17/00
(52) U.S. Cl. .............................. 707/104.1; 707/1; 707/6; 707/101; 707/102
(58) Field of Search ...................... 707/1, 6, 100–104.1, 707/516, 526, 530, 9, 10; 369/1–5, 13.01, 24.01–28.01, 47.36–47.48; 709/203; 704/260; 371/19; 395/200.42

(56) References Cited

U.S. PATENT DOCUMENTS

| | | | |
|---|---|---|---|
| 3,919,479 A | * 11/1975 | Moon et al. | 704/237 |
| 4,230,990 A | * 10/1980 | Lert et al. | 725/22 |
| 4,677,466 A | * 6/1987 | Lert et al. | 725/22 |
| 4,885,577 A | * 12/1989 | Nelson | 340/7.31 |
| 5,293,385 A | * 3/1994 | Hary | 714/38 |
| 5,903,727 A | * 5/1999 | Nielsen | 709/203 |
| 6,002,443 A | * 12/1999 | Iggulden | 348/553 |
| 6,188,659 B1 | * 2/2001 | Mueller et al. | 369/59.24 |
| 6,469,749 B1 | * 10/2002 | Dimitrova et al. | 348/722 |

FOREIGN PATENT DOCUMENTS

| | | | |
|---|---|---|---|
| EP | 0756 252 A1 | 1/1997 | G08B/3/10 |
| EP | 0756252 | * 1/1997 | G08B/3/10 |

OTHER PUBLICATIONS

Russell Borland, Microsoft Outlook 97, Microsoft Press, Select Edition, pp. 48, 52 and 94.*

* cited by examiner

*Primary Examiner*—Greta Robinson
*Assistant Examiner*—Linh Black
(74) *Attorney, Agent, or Firm*—Park, Vaughan & Fleming LLP

(57) ABSTRACT

A system generates an audio signature for a data item based on a source identifier associated with the data item. The system receives a source identifier along with a data item and maps the source identifier to the audio signature using a mapping function that allows a user to distinguish the audio signature from other audio signatures generated for other sources. The mapping functions always map the same source identifier to the same audio signature. The system outputs the audio signature to a user. This enables the user to associate the audio signature with the source. The data item can include, an electronic mail message, a pager signal, a telephone call, a data item in an instant messaging system, an indicator of an entry of a new participant into a conference call or a chat room, or an electronic cookie that identifies a client computer system to a web site.

27 Claims, 1 Drawing Sheet

METHOD AND APPARATUS FOR GENERATING AN AUDIO SIGNATURE FOR A DATA ITEM

BACKGROUND

1. Field of the Invention

The present invention relates to user interfaces for electronic devices, such as computer systems and telephones. More specifically, the present invention relates to a method and an apparatus for generating an audio signature for a data item based on a source identifier associated with the data item.

2. Related Art

As user interfaces for computer systems continue to evolve, audio indicators are becoming more frequently used to indicate state changes or to notify a user of specific actions that are occurring within a computer interface. These audio indicators may convey the same information as is conveyed through other media, such as graphical indicators on a computer display, or they may complement and/or modify the information conveyed through other media.

One of the benefits of using audio indicators in a user interface is that they convey information without requiring the user to look at the computer display. This is an advantage because sometimes a graphical indicator can be buried under other windows on the computer display. In this case, the user must manipulate the graphical display in order to view a particular graphical indicator.

Many changes in state within a computer system relate to the arrival of a particular data item, such as a piece of electronic mail, an updated web page, or a new value in a shared data structure (such as a change in a stock price). At present, such changes in state may be accompanied by an audio signal indicating, for example, that an electronic mail message has arrived. However, such audio signals do not convey information identifying where or who the message originated from.

Some telephone systems provide a different ring for phone calls received from an outside line versus phone calls received from internal extensions. However, this type of system does not further identify the source of the communication.

What is a needed is a method and an apparatus that associates different audio signals with data items that are received from different sources.

One challenge in customizing sounds from a large number of sources is to design sounds that enable a listener to differentiate between sounds associated with different sources. The task of manually associating sounds with many different sources can be quite time-consuming.

Hence, what is needed is a method and an apparatus that automatically associates different sounds with objects received from different sources.

SUMMARY

One embodiment of the present invention provides a system that generates an audio signature for a data item based on a source identifier associated with the data item. The system operates by receiving a source identifier along with a data item. (This source identifier can include an electronic signature identifying a source of a data item, such as an email address.) The system maps the source identifier to the audio signature using a mapping function that allows a user to distinguish the audio signature from other audio signatures generated for other source identifiers, and wherein the mapping functions always maps the same source identifier to the same audio signature. Next, the system outputs the audio signature to a user. This enables the user to associate the audio signature with the source from which the data item originated.

In one embodiment of the present invention, the source identifier can identify a human being, a computer system from which the data item originated, a computer program, a telephone line, an Internet Protocol (IP) address, or an intelligent agent on a computer network.

In one embodiment of the present invention, the data item can include an electronic mail message, a pager signal, a telephone call, a communication in an instant messaging system, an indicator of an entry of a new participant into a conference call, an indicator of an entry of a new participant into a chat room, or an electronic cookie that identifies a client computer system to a web site.

In one embodiment of the present invention, mapping the source identifier involves performing a hash function on the source identifier to produce a hash value for the source identifier, and then associating the hash value with the audio signature.

In one embodiment of the present invention, mapping the source identifier to the audio signature involves using a context for the data item so that the context influences the mapping. In a variation on this embodiment, the context can include a context related to the source of the data item, or a context related to a destination of the data item.

In one embodiment of the present invention, mapping the source identifier involves using a mapping function with the property that data items from the same source, but with different source identifiers, are mapped to the same audio signature. For example, an email message and a telephone call from the same person have different source identifiers (a telephone number versus an email address), but they can be mapped to the same audio signature, or to variations of the same audio signature.

In one embodiment of the present invention, outputting the audio signature includes outputting a tactile signal in the form of a vibration.

In one embodiment of the present invention, the audio signature includes a melody that identifies the source of the data item.

In one embodiment of the present invention, mapping the source identifier to the audio signature involves mapping the source identifier to an audio signature that is unique to the source identifier.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
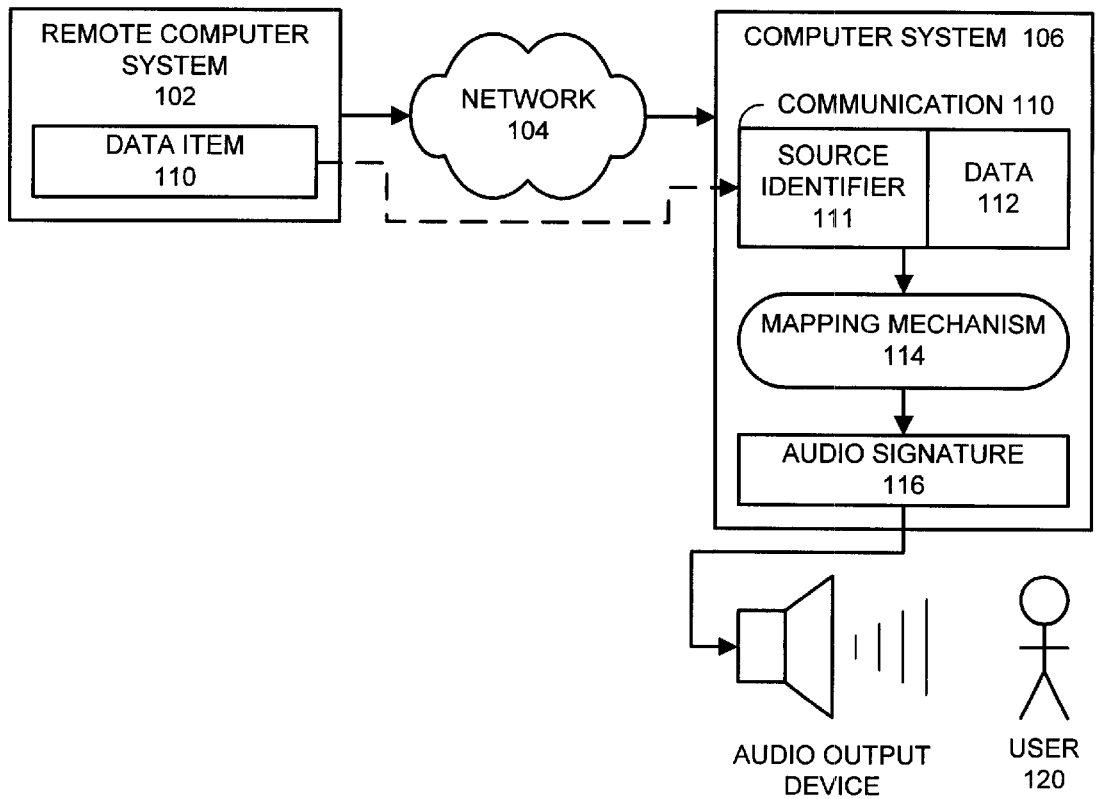
FIG. 1 illustrates a computer system in accordance with an embodiment of the present invention.

FIG. 1 illustrates a computer system 106, which is coupled to a remote computer system 102 through a network 104 in accordance with an embodiment of the present invention. Computer system 106 can include any type of computer system capable of receiving a data item 110 from an external source (such as remote computer system 102). This includes, but is not limited to, a computer system based on a microprocessor, a mainframe computer, a digital signal processor, a personal organizer, a device controller, and a computational engine within an appliance. Remote computer system 102 can include any source capable of transmitting data item 110 to computer system 106.

Network 104 can include any type of wire or wireless communication channel capable of coupling together computing nodes. This includes, but is not limited to, a local area network, a wide area network, or a combination of networks. In one embodiment of the present invention, network 104 includes the Internet.

Remote computer system 102 sends data item 110 to computer system 106 through network 104. Data item 110 can include any type of data item received by computer system 106, including, but not limited to, an electronic mail message, a pager signal, a telephone call, a communication in an instant messaging system, an indicator of an entry of a new participant into a conference call, an indicator of an entry of a new participant into a chat room, and an electronic cookie that identifies a client computer system to a web site.

Note that data item 110 includes source identifier 111 and data 112. Source identifier 111 can include any type of identifier for a source of a data item, such as a handle, a label, or an address (for example, an email address or an Internet Protocol (IP) address). Data 112 includes the data that forms the body of data item 110.

Within computer system 106, source identifier 111 passes through mapping mechanism 114. Mapping mechanism 114 converts source identifier 111 into an audio signature 116. Mapping mechanism 114 can include any type of hardware and/or software mechanism that can convert source identifier 111 into an audio signature 116.

The system outputs audio signature 116 through output device 118 so that a user 120 can hear the audio signature 116 associated with data item 110.

Process of Associating an Audio Signature with a Source Identifier

Figure 2:
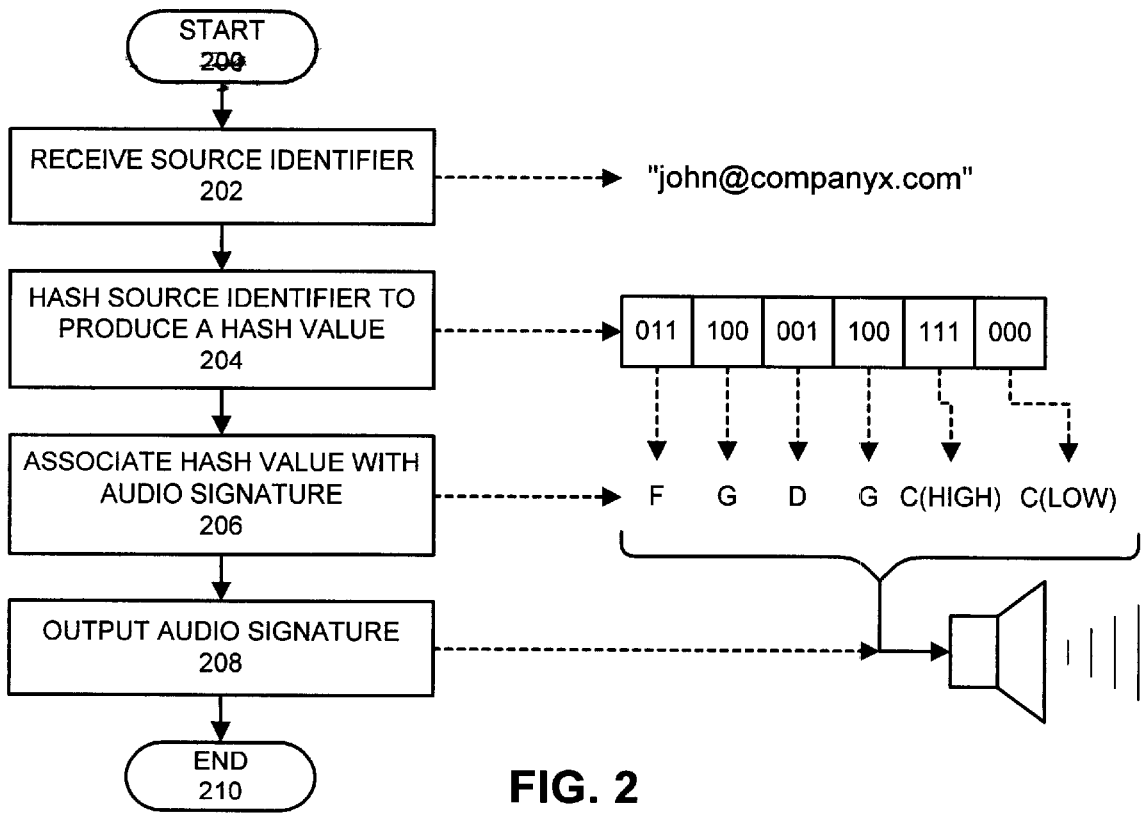
FIG. 2 illustrates the process of associating an audio signature with a source identifier in accordance with an embodiment of the present invention.

FIG. 2 illustrates the process of associating an audio signature with a source identifier in accordance with an embodiment of the present invention. The system starts by receiving source identifier 111 as part of a data item 110 from an external source, such as remote computer system 102 (step 202). For example, on the right-hand side of FIG. 2, source identifier 111 can include an electronic mail address for a sender of an email message.

Next, the system maps the source identifier 111 to audio signature 116. In one embodiment of the present invention, this mapping process is accomplished in two steps. First, the system hashes source identifier 111 into a hash value (step 204). For example, on the right-hand side of FIG. 2, the email address "john@companyx.com" is hashed to an 18-bit number "011100001100111000."

Next, the hash value is associated with an audio signature (step 206). For example, on the right-hand side of FIG. 2, the 18-bit hash value is split into six three-bit values 011, 100, 001, 100, 111 and 000. Each of these three-bit values is associated with a note in an octave of a C major scale. In this example, the values, 000, 001, 010, 011, 100, 101, 110, 111, are associated with the notes, C_low, D, E, F, G, A, B and C_high, respectively.

Next, the system outputs audio signature 116 through output device 118 from FIG. 1 so that user 120 can hear audio signature 116 (step 208).

In this way, a source identifier can be automatically mapped to an audio signature that can be distinguished from other audio signatures generated for other sources. Furthermore, this mapping is accomplished in such a way that the same source identifier always maps to the same audio signature. This provides audio signatures that are somewhat randomized over the audio space, so that sources can be distinguished from each other without requiring user to explicitly specify a mapping of source identifiers to audio signatures. (Note that the character of the randomness depends in the character of the hash function that is used.)

Also note that there is a tradeoff between how different the audio signatures are from each other, and the uniqueness of the mapping. If a very large set of possible audio signatures is used, it is easier to assign unique audio signatures to different source addresses. However, it also may be harder to distinguish between the very large number of possible audio signatures.

On the other hand, if a smaller set of possible audio signatures is used, it is easier to make these audio signatures distinguishable from each other. However, there is a greater chance that two different source identifiers will map to the same audio signature.

In one embodiment of the present invention, the mapping from source identifiers to audio signatures is done in such a way that data items from the same source, but having different source identifiers, are mapped to the same audio signature. For example, an email address for a person can map to the same audio signature as the telephone number for that person (or the Internet Protocol (IP) address for a machine belonging to the person).

This embodiment operates by maintaining a database that matches source identifiers to actual sources. For example, the database entry for a person may map the email address, IP address and telephone number for the person to the person's name (or social security number). In mapping a source identifier to an audio signature, this embodiment first performs a lookup based on the source identifier to find the name of the associated person, and then uses the name of the associated person as an input to the hash function. In this way all communications from a person, result in the same audio signature, even if the communications are through different communication mechanisms (such as telephone and email).

In a variation on this embodiment, communications from the same person (or source) but through different communication channels are mapped to related audio signatures so that they are recognizable as originating from the same source. For example, a telephone call from a person can be mapped to flute playing a specific melody while an email message from the same person can be mapped to an electric guitar playing the same melody. In this way, the communication channel provides contextual information for the mapping function.

In one embodiment of the present invention, the mapping process also takes into account contextual information. For example, a message received from John that is sent during business hours may produce a different audio signature than a message received from John after business hours. This contextual information can affect the mapping process in a number of ways. In one variation on this embodiment, the contextual information is inputted into the hash function along with the source identifier. This causes a completely new hash value, which results in a completely new audio signature. In another variation, the contextual information affects some other attribute of the audio signature, such as volume or pitch. For example, an urgent message from John can be given a louder audio signature than a non-urgent message.

Also note that the contextual information can be associated with the receiver of the data item as well as the source of the data item. For example, an email message sent to a distribution list can be mapped to a different audio signature than an email message sent directly to an email address.

As mentioned above, the contextual information can also relate to a communication channel through which a message is received, so that communications from the same person, but through different communication channels, are mapped to related audio signatures, so that the communications are recognizable as originating from the same source.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for generating an audio signature for a data item based on a source identifier associated with the data item, comprising:

receiving the source identifier for the data item, the source identifier specifying a source from which the data item originated;

mapping the source identifier to the audio signature for the source identifier in a deterministic manner, wherein mapping the source identifier to the audio signature includes using a mapping function that allows the user to distinguish the audio signature from other audio signatures generated for other source identifiers, and wherein the mapping fraction always maps the same source identifier to the same audio signature;

wherein mapping the source identifier includes:
performing a hash fraction on the source identifier to produce a hash value for the source identifier, and associating the hash value with the audio signature; and outputting the audio signature to a user, so that the user is able to associate the audio signature with the source from which the data item originated, wherein the audio signature includes a melody that identifies the source of the data item.

2. The method of claim 1, wherein the source identifier identifies one of:

a sender from whom the data item originated;

a computer system from which the data item originated;

a computer program;

a telephone line;

an Internet Protocol (IP) address; and an intelligent agent on a computer network.

3. The method of claim 1, wherein the data item includes one of:

an electronic mail message;

a pager signal;

a telephone call;

a data item in an instant messaging system;

an indicator of an entry of a new participant into a conference call;

an indicator of an entry of a new participant into a chat room; and an electronic cookie that identifies a client computer system to a web site.

4. The method of claim 1, wherein mapping the source identifier to the audio signature includes using a context for the data item in mapping the source identifier to the audio signature so that the context influences the mapping.

5. The method of claim 4, wherein the context can include at least one of:

a context related to the source of the data item; and a context related to a destination of the data item.

6. The method of claim 1, wherein mapping the source identifier includes using a mapping function with the property that data items from the same source, but with different source identifiers, are mapped to the same audio signature.

7. The method of claim 1, wherein source identifiers for data items arriving from the same source, but through different communication channels, are mapped to related audio signatures, so that the data items are recognizable as originating from the same source.

8. The method of claim 1, wherein outputting the audio signature includes outputting a tactile signal in the form of a vibration.

9. The method of claim 1, wherein mapping the source identifier to the audio signature includes mapping the source identifier to an audio signature that is unique to the source identifier.

10. A computer-readable storage medium storing instructions that when executed by a computer cause the computer to perform a method for generating an audio signature for a data item based on a source identifier associated with the data item, the method comprising:

receiving the source identifier for the data item, the source identifier specifying a source from which the data item originated;

mapping the source identifier to the audio signature for the source identifier in a deterministic manner, wherein mapping the source identifier to the audio signature includes using a mapping function that allows the user to distinguish the audio signature from other audio signatures generated for other source identifiers, and wherein the mapping function always maps the same source identifier to the same audio signature;

wherein mapping the source identifier includes:
performing a hash function on the source identifier to produce a hash value for the source identifier, and associating the hash value with the audio signature; and outputting the audio signature to a user, so that the user is able to associate the audio signature with the source from which the data item originated, wherein the audio signature includes a melody that identifies the source of the data item.

11. The computer-readable storage medium of claim 10, wherein the source identifier identifies one of:
   a sender from whom the data item originated;
   a computer system from which the data item originated;
   a computer program;
   a telephone line;
   an Internet Protocol (IP) address; and
   an intelligent agent on a computer network.

12. The computer-readable storage medium of claim 10, wherein the data item includes one of:
   an electronic mail message;
   a pager signal;
   a telephone call;
   a data item in an instant messaging system;
   an indicator of an entry of a new participant into a conference call;
   an indicator of an entry of a new participant into a chat room; and
   an electronic cookie that identifies a client computer system to a web site.

13. The computer-readable storage medium of claim 10, wherein mapping the source identifier to the audio signature includes using a context for the data item in mapping the source identifier to the audio signature so that the context influences the mapping.

14. The computer-readable storage medium of claim 13, wherein the context can include at least one of:
   a context related to the source of the data item; and
   a context related to a destination of the data item.

15. The computer-readable storage medium of claim 10, wherein mapping the source identifier includes using a mapping function with the property that data items from the same source, but with different source identifiers, are mapped to the same audio signature.

16. The computer-readable storage medium of claim 10, wherein source identifiers for data items arriving from the same source, but through different communication channels, are mapped to related audio signatures, so that the data items are recognizable as originating from the same source.

17. The computer-readable storage medium of claim 10, wherein outputting the audio signature includes outputting a tactile signal in the form of a vibration.

18. The computer-readable storage medium of claim 10, wherein mapping the source identifier to the audio signature includes mapping the source identifier to an audio signature that is unique to the source identifier.

19. An apparatus that generates an audio signature for a data item based on a source identifier associated with the data item, comprising:
   a receiving mechanism that receives the source identifier for the data item,
   the source identifier specifying a source from which the data item originated;
   a mapping mechanism that maps the source identifier to the audio signature for the source identifier in a deterministic manner, wherein mapping the source identifier to the audio signature includes using a mapping function that allows the user to distinguish the audio signature from other audio signatures generated for other source identifiers, and wherein the mapping function always maps the same source identifier to the same audio signature;
   wherein mapping the source identifier includes:
      performing a hash function on the source identifier to produce a hash value for the source identifier, and
      associating the hash value with the audio signatures and
   an output mechanism that outputs the audio signature to a user, so that the user is able to associate the audio signature with the source from which the data item originated, wherein the audio signature includes a melody that identifies the source of the data item.

20. The apparatus of claim 19, wherein the source identifier identifies one of:
   a sender from whom the data item originated;
   a computer system from which the data item originated;
   a computer program;
   a telephone line;
   an Internet Protocol (IP) address; and
   an intelligent agent on a computer network.

21. The apparatus of claim 19, wherein the data item includes one of:
   an electronic mail message;
   a pager signal;
   a telephone call;
   a data item in an instant messaging system;
   an indicator of an entry of a new participant into a conference call;
   an indicator of an entry of a new participant into a chat room; and
   an electronic cookie that identifies a client computer system to a web site.

22. The apparatus of claim 19, wherein the mapping mechanism is configured to use a context for the data item in mapping the source identifier to the audio signature so that the context influences the mapping.

23. The apparatus of claim 22, wherein the context can include at least one of:
   a context related to the source of the data item; and
   a context related to a destination of the data item.

24. The apparatus of claim 19, wherein the mapping mechanism is configured to use a mapping function with the property that data items from the same source, but with different source identifiers, are mapped to the same audio signature.

25. The apparatus of claim 19, wherein source identifiers for data items arriving from the same source, but through different communication channels, are mapped to related audio signatures, so that the data items are recognizable as originating from the same source.

26. The apparatus of claim 19, wherein the output mechanism is configured to output a tactile signal in the form of a vibration.

27. The apparatus of claim 19, wherein the mapping mechanism is configured to map the source identifier to an audio signature that is unique to the source identifier.

* * * * *